United States Patent
Eberlein et al.

(10) Patent No.: US 9,898,279 B2
(45) Date of Patent: Feb. 20, 2018

(54) OPTIMIZING ABAP DEVELOPMENT AS A SERVICE

(71) Applicant: SAP SE, Walldorf, DE (US)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 15/087,677

(22) Filed: Mar. 31, 2016

(65) Prior Publication Data

US 2017/0286067 A1    Oct. 5, 2017

(51) Int. Cl.
G06F 9/44    (2006.01)
G06F 7/00    (2006.01)
G06F 17/00   (2006.01)
G06F 17/30   (2006.01)

(52) U.S. Cl.
CPC ............ *G06F 8/70* (2013.01); *G06F 8/30* (2013.01); *G06F 8/31* (2013.01); *G06F 8/36* (2013.01); *G06F 8/71* (2013.01); *G06F 17/30289* (2013.01); *G06F 17/30292* (2013.01); *G06F 17/30587* (2013.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |

(Continued)

*Primary Examiner* — Lewis A Bullock, Jr.
*Assistant Examiner* — Mark Gooray
(74) *Attorney, Agent, or Firm* — Fish & Richardson P.C.

(57) ABSTRACT

A development account is provisioned, the provisioning including a request for a backing service. The backing service includes: generating a developer schema in a database, generating a table link in the developer schema to shared tables required for the new development environment, generating a delta table, and generating a union view with a defined instead-of-trigger used to write, update, or delete from the delta table upon a write, update, or delete operation on the union view. A runtime application server is obtained and a repository is configured in a version control system. The runtime application server is configured to connect to the generated developer schema of the provisioned development account, and an identifier is provided to the provisioned development account.

15 Claims, 5 Drawing Sheets

(56) References Cited

U.S. PATENT DOCUMENTS

| | | |
|---|---|---|
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 2002/0091677 A1* | 7/2002 | Sridhar ............ G06F 17/30392 |
| 2004/0068713 A1* | 4/2004 | Yannakoyorgos .. G06F 11/3672 717/101 |
| 2008/0162587 A1* | 7/2008 | Auer ........................ G06F 8/60 |
| 2011/0035303 A1* | 2/2011 | Jakstadt ................ G06Q 20/10 705/34 |

\* cited by examiner

OPTIMIZING ABAP DEVELOPMENT AS A SERVICE

BACKGROUND

Current ABAP language software development is typically actively managed by a large software development team that sets up software development systems and transport routes. The ABAP software development environment is built on other paradigms than current platform-as-a-service (PaaS)-type system architecture. For example, an ABAP software development environment works well for large teams of developers and integrating contributions by different development teams. For scenarios with single or few developers working on a project and requiring isolated development environment, the infrastructure and operations overhead is considerable. The development environment and operation costs as well as for example, provisioning KPIS are insufficient for small teams. As a result, ABAP development is often not suitable for small software development teams or even single software developers.

SUMMARY

The present disclosure describes methods and systems, including computer-implemented methods, computer program products, and computer systems for optimizing ABAP development as a service.

In an implementation, a development account is provisioned, the provisioning including a request for a backing service. The backing service includes: generating a developer schema in a database, generating a table link in the developer schema to shared tables required for the new development environment, generating a delta table, and generating a union view with a defined instead-of-trigger used to write, update, or delete from the delta table upon a write, update, or delete operation on the union view. A runtime application server is obtained and a repository is configured in a version control system. The runtime application server is configured to connect to the generated developer schema of the provisioned development account, and an identifier is provided to the provisioned development account.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, overhead for one development environment is minimized to a schema and a set of tables in the schema. Second, the majority of the set of tables and all shared content are created only once in the master, which allows providing significant volume of data for test (for example, performance) with low footprint for additional development environments. Third, costs for patching and upgrading the infrastructure to a new version of an ABAP system (for example, basic or suite) occur only once for the master, not for each developer account. Fourth, code created by software developers can be kept and archived in the GIT source code management system and individual change management processes to manage code sources. No ABAP system with all the standard vendor code plus some owned development artifacts need to be stored and archived. Fifth, only one master for each release and the development artifacts in GIT are required. This can minimize the database footprint, especially, if a large number of developer accounts need to be managed. Sixth, by using an external version control system additional development processes and continuous integration processes can be defined than using standard ABAP transport landscapes. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
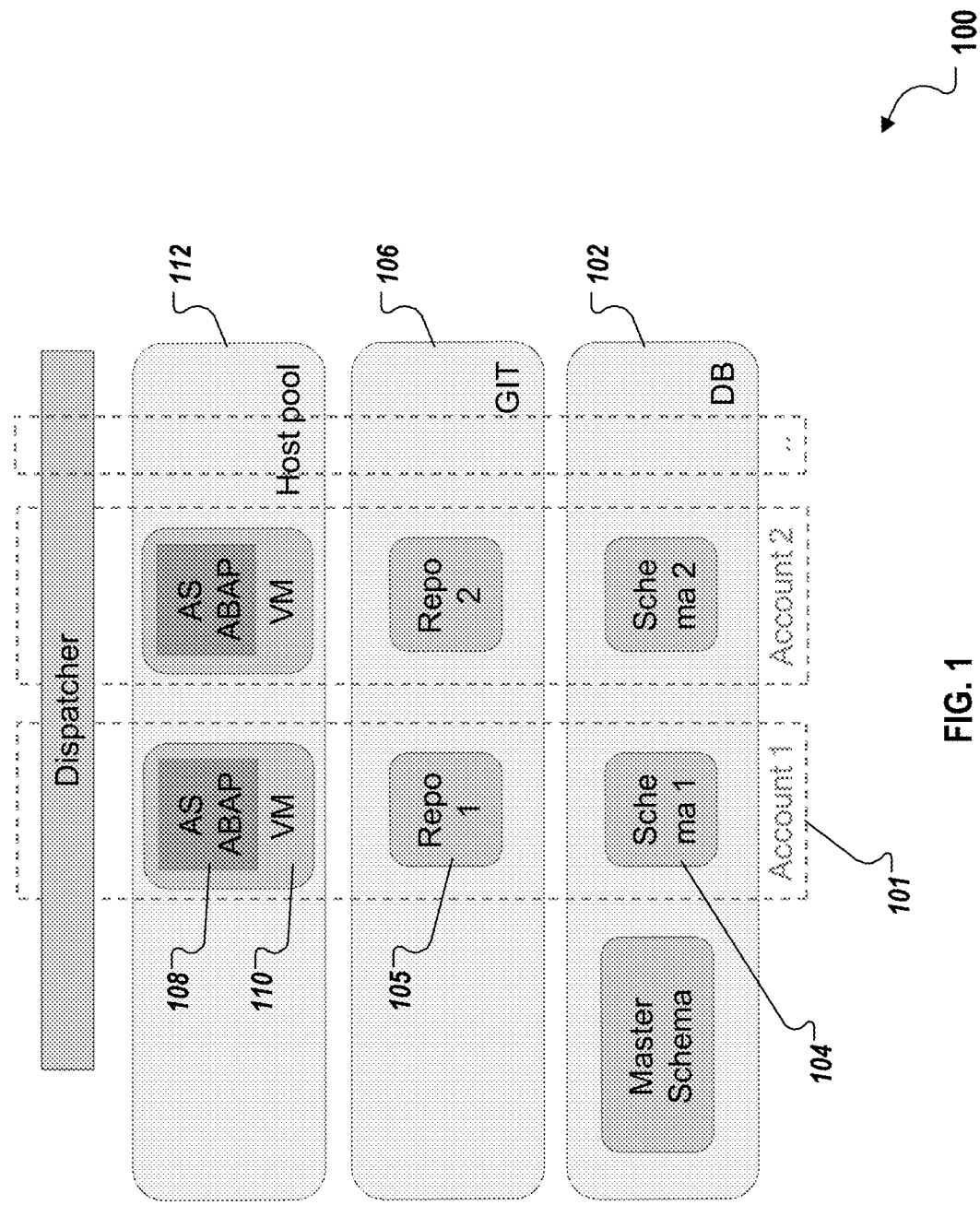
FIG. 1 is a block diagram illustrating development accounts in a database schema, a GIT repository, and ABAP application server, according to at least one described implementation.

The following detailed description describes optimizing ABAP development as a service and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Current ABAP language software development is typically actively managed by a large software development team that sets up software development systems and transport routes. The ABAP software development environment also does not fit into a platform-as-a-service (PaaS)-type system architecture (for example, CLOUDFOUNDRY). As a result, ABAP software development overhead can be considerable as reflected in poor key performance indicators (KPIs) (for example provisioning KPIs), excessive cost, but also from a duration perspective. ABAP development is often not suitable for small software development teams or even single software developers. To integrate ABAP into an infrastructure like PaaS, various problems need to be solved.

For example, ABAP is very integrated and design time objects are stored in a database together with application data (that is, each ABAP system has its own repository in its own database). Development artifacts are created in the ABAP system and are also stored in its own database. As each isolated development needs its own ABAP system. Depending on the system, the developer wants to develop on (for example, a NetWeaver basis system or a Suite system, ERP, CRM, industries, Add-Ons and so on), the system has a considerable footprint in the DB. A single ABAP system for one developer or a small number of developers results in considerable overhead (for example, several dozen GB in a database schema).

Development change management works in ABAP using transport tools. These tools operate on delta packages. Changes done by a developer are added to a transport order. The objects on one transport order can be transported from one system to another. Only the objects on the transport are brought from source to target. The transport tools work using a shared directory between source and target: the transport directory. The tools write to and read from the transport directory. The development process in ABAP is typically done using a static setup of systems and transport paths between the systems. The transports are managed by admins. The developers release a transport, but the import is scheduled and controlled by admins.

In ABAP there are mainly two versions, an inactive and an active version, but this concept is not consistently implemented through all editors, frameworks and object types. There is a version management system in ABAP. Earlier versions of objects can be seen in and taken from version management. This works for a large set of development artifacts, but not for all (for example, not for plain table content).

Considering privacy, if one system is used for several developers, there is no privacy. Developers can see and consume most content. Content written to client independent tables or client 000 can in principal be seen by all users of the ABAP system. Especially, if a user has developer rights, other content, development artifacts can be seen and accessed.

What is needed is a software development space enabling not only the creation of data and content in an isolated way, but separating development artifacts, including database objects as needed for code push-down in databases, for example an in-memory database such as SAP HANA. With the externalization of this space, developments can be redeployed to arbitrary systems in a cloud-computing environment, meaning that there is no need to assign developers to dedicated software development systems and therefore less computing systems need to be active at the same time.

With this approach the need for several costly operational tasks like upgrades or backups can be removed as deployments can be made to a fresh system. By leveraging latest features in HANA (for example, table links/projection views), the size of developer spaces can be reduced in a way that was not previously possible. Pre-configuration and demo data in a shared space is merged with owned content in a deployment step, individualized for each service consumer.

At a high-level, SAP builds on the HANA CLOUD PLATFORM (HCP) with a Platform as a Service (PaaS) offering. This infrastructure can be used to provide Development as a Service (Dev aaS) offerings for runtimes such as JAVA and NODE.JS using a source code versioning system (for example, the GIT source code management system and individual change management processes) to manage code sources. Databases are integrated as "Backing Services." No central administration and set up of transport paths are required. Software developers and teams receive their own schema in a DB, but not in a full ABAP system. Read-only content (necessary to develop code and run software tests) can also be shared. The setup of a new development system can be provided by self-services. Once a software development system is no longer needed, it can then be removed. Software code remains in GIT and at a later point in time, the system can be set up again based on the data in GIT. There is no need to keep multiple ABAP development systems, because some development can be archived.

The advantage of a PaaS is a high-level of available self-services for developers to create products on top of the PaaS. Infrastructure and operational costs for software development are low as no dedicated management of development infrastructure is required. Software development teams can run processes on their own. The PaaS is light weight and single software developers can take advantage of such an infrastructure to develop software and to create sets of tools and applications. Many ABAP software developments use their own tools for software development and can be offered an ABAP PaaS space to develop tools, maintain them, and package them for delivery to be used in customer projects. Small software development teams could start development with low overhead in a "self-service way." As previously stated, no central team needs to set up systems and transport paths.

In a typical implementation, a group of software developers working on one project get a shared account (for example, one DB schema, Application server and GIT space). With respect to the use of GIT:

Development artifacts are managed in GIT.
GIT content can be transformed into ABAP transport files, which can be deployed to a ABAP system.
Development in ABAP can be exported to a file system and inserted into a GIT repository.

With respect to runtime:
The "runtime" (for example, in COLDFUSION terms) could be the ABAP application server (AS ABAP).
Repository.

With respect to a backing service:
The "backing service", namely the DB, could be a DB schema with the standard ABAP basis or Suite tables, but initially without developer artifacts.
Repository.

With respect to the ABAP system:
ABAP application server (OS executables)
Schema in the DB with the ABAP tables and the ABAP reports and so on.

Repository.

Two new paradigms are used with respect to the described subject matter:

1. Store the ABAP sources and configuration content in GIT.

ABAP development artifacts are imported into GIT. For example, in ABAP, the tools tp and R3trans can be used to export development artifacts and content from an ABAP system and import them. These tools have been extended, so R3trans can write the objects in plain text format to a file system (instead of a current compressed format). Each development artifacts is written to an own file. There are then files like "report", "class", "table definition", "table content" and so on. These files can be imported into a GIT repository. Note that the other direction can be built as well. GIT content can be written to a file system and R3trans could create standard transport data files. Such a file could be used by tp and R3trans to deploy the content to an ABAP system. During the deployment (in ABAP "import"), the transport tools create tables if defined in the transport file and deploy content to ABAP repository or to DB tables.

This allows dropping the DB schema and re-creating the developer account from a GIT repository, if desired. Long term storage of the development project is thus less expensive. It is only the code in GIT. Not a complete ABAP systems DB backups as currently performed.

This also allows setting up development projects using several GIT repositories, each with an own DB schema and using standard GIT branch technology to manage changes. A new DB schema can be requested for a certain task, the code is managed via GIT and after the task, the DB is dropped. All changes and history is still available in GIT.

2. Share the vendor (for example, SAP) default.

Using the table-link concept, ABAP repository can be shared among all accounts. The content may not be modified anyway. ABAP repository tables are present in the shared DB schema and are exposed to the local DB schema via a table-link.

A further optimization with views, links, delta tables and instead-of-triggers is possible, if required to further minimize costs. Storage of developer local content into shared tables works like this: a delta table is created with the same structure as the shared table. Then a union view is created, delivering upon select the local content of shared content, if no local content is present. An instead-of-trigger is defined on the union view: upon insert, the instead-of-trigger writes to the local delta table.

The table-link approach allows the usage of HANA views (compared to sharing the data via SQL views, where the usage of HANA views is not possible).

This allows setting up a DB schema quickly and with low memory footprint. Especially interesting in the context of in-memory DB.

This approach can also be used to share demo data. For developing HANA views and analytical UI with Fiori on top, a representative consistent set of demo data can be very helpful. It is quite hard to provide such a set of data for a business application: first business configuration has to be defined, then data sets have to be created—some of the application data tables have more than 100 fields a lot with foreign key relationships. Creating demo data thus requires using application API. The vendor could provide demo data, shared, and linked into the developer schema.

FIG. 1 is a block diagram 100 illustrating development accounts in a database schema, a GIT repository, and ABAP application server, according to at least one described implementation. Several development accounts 101 can exist in the illustrated system. In a standard configuration, a database 102 holds several schemas (for example schema 1 104). One schema contains the desired platform, for example, an ABAP basic or suite system. If a new schema is required for a new system, the schema can be cloned (for example, using database mechanisms or using R3load export/import).

In the described system, a new software development environment is composed of a space (for example, repository Repo 1 105) within GIT 106, an ABAP application server (for example, AS ABAP 108 in a virtual machine (VM) 110 executing on a host pool 112) and a database schema (for example schema 1 104) in a database (for example, database 102).

Development systems are not used 24*7. Also an initial "long-in time" of two to three minutes in the morning could be acceptable. This allows starting the ABAP application server when developers are logged in and to stop the application server once the last developer has logged off. If a developer wants to log-in, the application server is started. Startup time and performance for a development system are fast. No buffers need to be filled for full performance. This configuration helps to reduce an overall runtime footprint.

Figure 2:
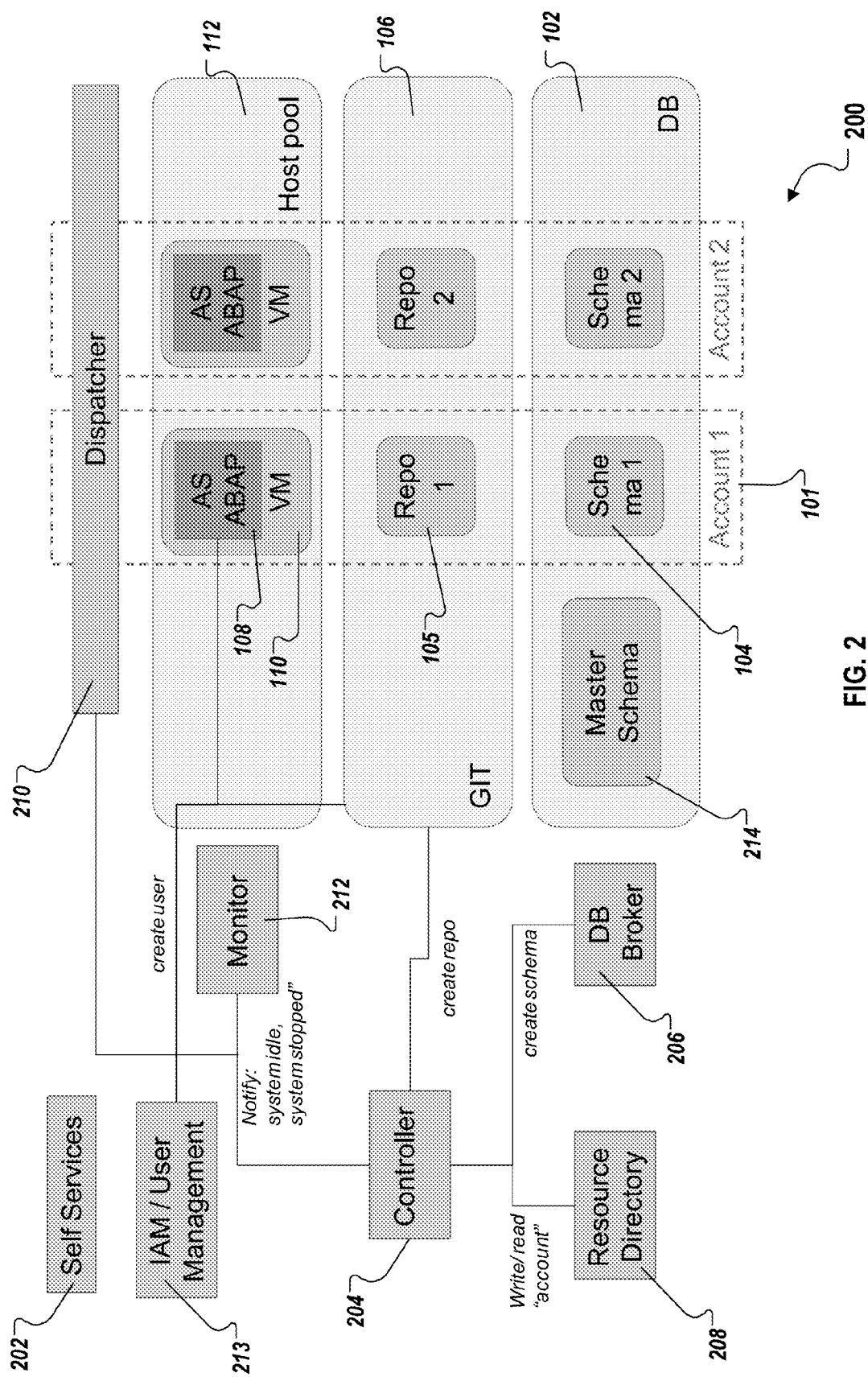
FIG. 2 is a block diagram illustrating components used to operate the described ABAP Dev as a service, according to an implementation.

FIG. 2 is a block diagram 200 illustrating components used to operate the described ABAP Dev as a service, according to an implementation. As will be appreciated by those of ordinary skill in the art, the illustrated set of components are to be taken as an example distribution of tasks. Consistent with this disclosure, the illustrated set of components can be substituted, grouped, separated, etc. in different configurations. These other configurations are considered to be within the scope of this disclosure. For example, start/stop and host management will vary depending on the infrastructure used (for example, infrastructure-as-a-service (IaaS)).

Developers can create/delete a new development account (for example, account 101) using a self-service user interface 202. As described above, a new development account typically includes a repository 105 in GIT 106, a DB schema 104 and an application server instance 108. In some implementations, a developer can put an account 101 into a "hibernate" status, meaning not using the DB schema 104 and application server 108, but continuing the GIT repository 105 content.

Within GIT 106, a developer obtains an account (as part of account 101) and can create repository 105. Projects can also be imported into and exported out of GIT (for example, from and to a local file system).

Controller 204 calls a DB broker 206 to create a DB schema (for example, schema 1 104) and new user (for example, account 1 101). In typical implementations, the controller 204 calls GIT 106 to create the repository (for example, repo 1 105) for the new user. The controller 204 also requests a free host from IaaS/host pool 112 and starts a virtual machine (for example, VM 110) with the application server (for example, AS ABAP 108) within.

Information from a Resource Directory 208 is retrieved for the developer. The information is injected into the VM and application server configuration about the DB schema and DB user to set up an ABAP application server DB connection and GIT user to set up a connection to GIT.

If a dispatcher 210 is notified about a login attempt and/or a missing application server, the dispatcher 210 starts an application server. The dispatcher 210 stops the application server if a monitor 212 reports the server is idle. Note that particular policies can be applied (for example, to not stop systems during week days between 8:00 and 19:00, or other policies).

An Identity and Access Management (IAM)/User Management 213 component can be used to provide user management, so for different development teams, users can be created in the GIT and the ABAP application server.

The resource directory 208 above is used to maintain lists of used services by each development team. For example, for an "Account" (for example, account 101):
GIT repository,
DB schema and user, and
application server host.

Connection is done through the dispatcher 210. If a required application server (such as AS ABAP 108) is not up and running, the dispatcher 210 triggers the controller 204 to start the instance of the application server. In typical implementations, the connect is routed to a "system starting up" page, until the instance can be reached. The dispatcher 210 routes incoming user requests to a correct application server instance.

The DB Broker 206 creates a DB user and DB schema for a new account and can also delete a DB schema and DB user including all deployed content in a DB schema. The DB Broker 206 also creates links to a master schema 214 (data is exposed read-only to the development accounts using the links), creates own tables and views for a user and associated database triggers.

The monitor 212 supervises activities in ABAP runtimes. If no developer is logged in and no custom batch job is running in the system, the monitor 212 reports to the controller 204, that the application server (for example AS ABAP 108) is idle.

Figure 3:
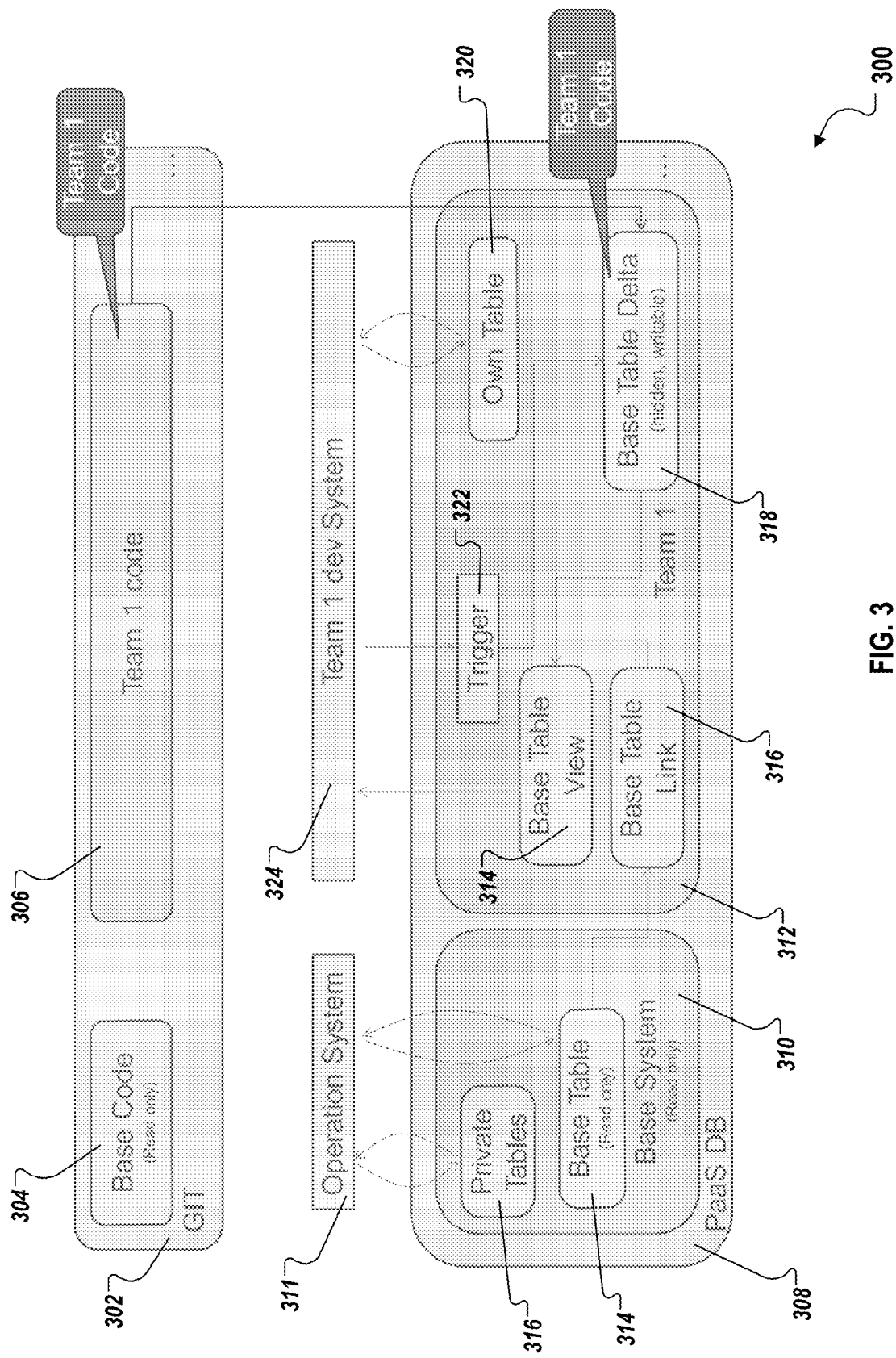
FIG. 3 is a block diagram illustrating sharing data from a master schema, according to an implementation.

FIG. 3 is a block diagram 300 illustrating sharing data from a master schema, according to an implementation. In the illustration, for a development team 1, GIT 302 (for example, GIT 106 from FIGS. 1 & 2) contains base code (read only) 304 and team 1 code 306. A platform-as-a-service (PaaS) database (for example, database 102 in FIGS. 1 & 2), contains a read-only base system 310 and a team 1 space 312. Base system 310 includes a base table 314 and private tables 316 and is connected to an operation system 311. The operation system typically includes 202, 204, 206, 208, 212, and 213 identified in FIG. 2. In other implementations, the operation system can include more or less components as identified in FIGS. 1-4. Team 1 space 312 includes a base table view 314, base table link 316, base table delta 318 (a database table storing table deltas), an own table 320, and trigger 322. The team 1 space is connect to the team 1 development system 324. The team 1 code stored in GIT (306) is then deployed to the base table delta 318.

When considering reducing the above-described database footprint, one ABAP system including a runtime (kernel) and a database with all content of the underlying product (The basic runtime platform, a business warehouse solution using the platform, an enterprise resource planning system, industry specific extensions to the enterprise resource planning system, a customer relationship system and others) can create a large amount of overhead. The idea for a low-footprint solution for small teams and even single developers (for example, consultants) creating and managing their own tools and content, is to provide an ABAP backing service, which offers an individual schema, isolated repository, and runtime to the developer, but sharing tables and data which are not changed by the developers (neither structure nor content). In this concept, a developer does not modify content of a vendor, repository of a Basis or Suite System, or configuration content (that is, this data is read-only). This allows sharing this data among several developers. Every developer having an individual repository of this read-only data is duplicative and wastes resources.

In setting up a database with the ABAP system, a developer works on top (for example, a basis or suite system as a master schema 310) and another database schema 312 is created for one developer or team in the same database. The basis tables (for example, base tables 314) required to develop and run the system are published from the master schema using a base table link 316. In addition, for each base table linked into the schema 312, a table is created to hold local data, then a base table view 314 is created to join the local and read-only master data. The base system 310 can contain private tables 316 for operating the system (311), which are not exposed to the developer system 312.

For example (the table holding the report sources):
Link REPOSRC_MASTER.
Local table REPOSRC_LOCAL.
View REPOSRC, joining REPOSRC_LOCAL and REPOSRC_MASTER.

If the database 308 provides a built-in mechanism to create a similar mechanism of read-only shared data and several deltas on top, this can be used instead and is considered to be within the scope of this disclosure.

Writing data to the base table view 314 is redirected into a schema local table (own table 320), for example using a trigger 322. Alternatively, the ABAP kernel can be made aware of the local table 320 and redirect writes to <TABLE>_LOCAL. Similarly, for a "select for update", the ABAP kernel can redirect the select to <TABLE>_LOCAL.

In the described implementation, there are one or more sets of tables in the team space 312. Here a set of tables includes for each base table, one base table link, one base table delta, and one base table view.

The illustrated system includes a number of processes. For example, setting up an infrastructure, a database (for example, database 308) is installed. Then the ABAP master system (with all code and content) is deployed to the database. In typical implementations, the ABAP kernel (ABAP application server 108) is provided in a container, ready to be started in a computer operation system 311 without the need for installations in the computer operating system (for example, this can be done using ColdFusion-style "build packs", which deploy a kernel into a container and starts the kernel).

In the case where a GIT system is needed, a developer account needs to be created. As described above, the developer receives an account in GIT 302 to create developer-associated (own) repositories. A new DB schema (312) is then created. Required tables with shared content are linked in, local tables are created, views and triggers are created. Tables which are empty in the master and are required to run the system are created in the own schema directly, without the link and view and trigger mechanism. If they need to contain a few data sets, they can be deployed to the tables directly.

The new schema's login credentials are passed to the build pack, a kernel is configured with the access parameters and started in a container. A master user is created in the ABAP system for the developer. The developer receives access to the ABAP system and can develop or create new users.

In development, developers create content in the ABAP system directly. Changes are registered on a transport as the ABAP standard development process (note that the registration can be optimized for a GIT connection, if desired). Once the developer wants to take a snapshot for a version history, the transport can be released and exported to the GIT. If an own table (for example, own table 320) is created, the own table is created in the own schema (for example, team 1 code 312).

If a table of the basis or suite system is to be used with content, there is a function to create the base table link 316 to the master schema 310, create a local base table delta 318, create a union view (for example, base table view 314) on base table link 316 and base table delta 318 and the instead-of-trigger 322 redirecting the write to the local table delta 318. If an application table (A-table, empty in the master) is needed, it is created in the local schema directly, without the link, local table, view and trigger as described.

In typical implementations, the vendor provides a default customizing in client 000 in the master. Configuration and application tables have a client key field. To create own customizing, a developer can specify a new client and copy and modify or create their own customizing in this client. Customizing can then be written to a transport as well and exported to GIT.

The account for the developer can be removed easily, and the development artifacts created can either be kept in GIT or exported for a hand-over to the developer from GIT. The database schema and runtime with the kernel can then be deleted. If a developer wishes to recover an account, the process described above is executed. In addition, the developer uploads the own content package to GIT and triggers a "GIT push" to the runtime. This creates a transport file out of the GIT artifact and calls tp import to deploy the package to the schema. Own tables are created and own content is deployed to the local tables. If content for table is deployed, which is not part of an initial local schema setup, the link, local table, view and trigger setup is also created.

If a development project becomes bigger, typically two or more systems are desired: 1) to develop and have the latest versions in and 2) a version for integration testing with a more stable version. In some implementations, an additional assembly system may be desired.

In typical implementations, a setup resembles:
One schema and runtime is set up for development, test and assembly (as desired).
Each of these runtimes are connected to GIT and have an own repository or branch there.
In GIT there is the option to merge branches from development branch to test branch to assembly branch or push to the next GIT repository.

A transport from development to test is then performed similar to the following:
The transport is released in development.
The transport is exported, the data file is written to plain sources in a directory structure and committed to GIT development branch.
The development branch is then merged in GIT to the test branch.
The target test branch is fetched to disk, the transport file is created and imported into the target schema.

There is thus no transport directory as usual in ABAP.

To assemble a transport (which can be brought to an ABAP system), on the assembly system, either the transport data files are downloaded, or the Add-On Assembly-Kit (AAK) is used to create an own Add-On. The Add-On data file can then be downloaded.

To upgrade the master, in fact, the master itself is not upgraded; a new master is set up with a new version (a new schema like 310 is created with the new version of the system). The local schemas 312 are re-linked to the new master afterwards. To perform the re-linking, the structure changes of the tables 314 linked into the local schema are analyzed. The local delta tables 318 and union views 314 in 312 are adjusted to the structure of the master table.

Figure 4:
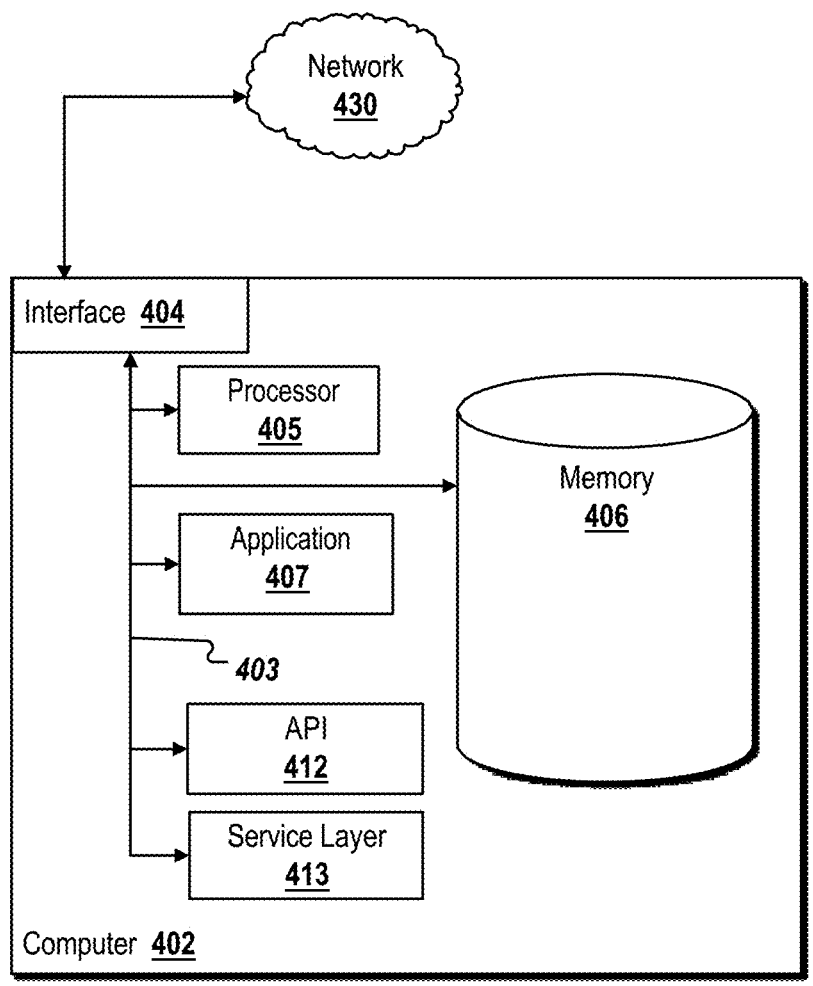
FIG. 4 is a block diagram of an exemplary computer system used to provide computational functionalities associated with described algorithms, methods, functions, processes, flows, and procedures for optimizing ABAP development as a service as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Figure 5:
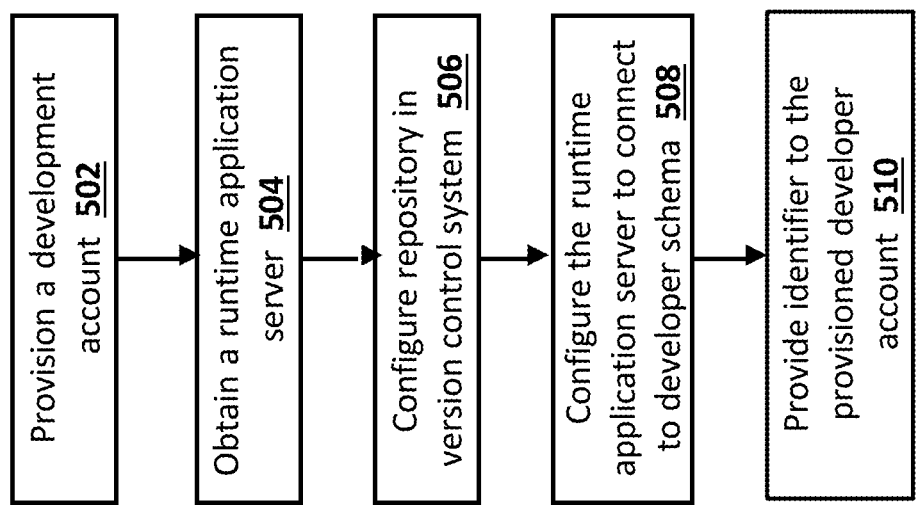
FIG. 5 is a flowchart of an example method for optimizing ABAP development as a service, according to an implementation.

FIG. 5 is a flowchart of an example method 500 for optimizing ABAP development as a service, according to an implementation. For clarity of presentation, the description that follows generally describes method 500 in the context of the other figures in this description. However, it will be understood that method 500 may be performed, for example, by any suitable system, environment, software, and hardware, or a combination of systems, environments, software, and hardware as appropriate. In some implementations, various steps of method 500 can be run in parallel, in combination, in loops, or in any order.

At 502, a development account is provisioned, the provisioning including a request for a backing service. The request for a backing service includes: generating a developer schema in a database; generating a table link in the developer schema to shared tables required for the new development environment; generating a delta table; and generating a union view reading data from the delta table and a shared table corresponding to the delta table. In some implementations, the delta table has the same key as a corresponding shared table and additional fields. In some implementations, the union view has a defined instead-of-trigger used to write, update, or delete from the delta table upon a write, update, or delete operation on the union view. The table link links to a master database schema. Each delta table has the same structure of a corresponding shared table. The union view selects from the delta table if content exists, otherwise from the shared table. From 502, method 500 proceeds to 504.

At 504, a runtime application server is obtained. The runtime application server writes to the delta table and reads from the delta table and the shared table corresponding to the delta table. A determination is made if content associated with the development account already exists in the version control system. If content exists in the version control system: a selection of a repository in the version control system to use is received, content associated with the selected repository is synced to a file system directory structure, a tool is called to create a deployment file out of the content associated with the selected repository, and a deploy tool is called to deploy the deployment file to the provisioned development account. From 504, method 500 proceeds to 506.

At 506, a repository in a version control system is configured. From 506, method 500 proceeds to 508.

At 508, the runtime application server is configured to connect to the generated developer schema of the provisioned development account. From 508, method 500 proceeds to 510.

At 510, an identifier is provided to the provisioned development account. After 510, method 500 stops.

If code or content is changed in the development account, changes to the code or content is written to a transport order, and once the transport is released, the transport is exported to a file system and imported to the version control system repository.

Developer content is fully available in a version control system (for example, GIT). The artifacts created using editors are put to a transport and then imported to the version control system. Table content (configuration) can be added as a transport object (for example, "TABU") to the transport order and this way also imported to the version control system. In fact all design time content which can be transported, can also be imported to the version control system. The content is transformed into a text representation (for example, by R3trans) for import to the version control system. The set of transport objects can be also extended to artifacts which are used for managing operations, such as user repository, batch repository, destination repository, technical configuration and so on. All transport objects (also logical transport objects) can be imported to the version control system.

Demo and test content can be managed in two ways: 1) typically, a developer wants to have transactional and master data to test the code and configuration. This content can be added to the version control system using a "table content" (for example, TABU). The content needs to be separated from the code and configuration, in order to allow separating it during a deployment. 2) Another option is to create the demo and test content using a program and only adding the program to the version control system.

In typical implementations, for the above-described request for a "backing service," an ABAP schema is created in a database, links are included to a master schema and local tables for delta storage. An empty database schema is created. Then, database tables required for the development environment are created as a link in the new schema to the shared tables as "TABLE_SHARED". An additional table named "TABLE_DELTA" is created with the same structure. A union view is created with name "TABLE" selecting from TABLE_DELTA if content exists, otherwise from TABLE_SHARED. An instead-of-trigger is defined for the view TABLE, which writes upon update or insert to the delta table. For a delete, the trigger deletes from the delta table only, if no record is there, delete is rejected. Tables required as read-only are created as table link to the new schema only.

Note that the above-described approach can become increasingly complex, if the shared content can be "modified." In the described approach, the code provided using a basis system (for example, NetWeaver or SAP Business Suite) is strictly read-only. Tables can only be extended using "appends," as long as the standard software is prepared for appends to own tables. The extensibility mechanisms provided by SAP ABAP apply here: table appends, extension points (for example, "BADI"s). To create an append to a shared table, two mechanisms can be envisioned: 1) easiest, but requiring more resources, is to create a copy of the shared table in the local DB schema of the developer and extend the table structure by the append or 2) another approach is to create a second table in the local DB schema of the developer, which has the same key fields as the shared fields, add the append to this local table, and create a join view over the shared and local tables. Appends are structures defined by developers, which can be added modification-free to vendor tables. Upon a change of a vendor table, the append is always kept. The fields have names in an own namespace to avoid conflicts with new fields delivered by the vendor. BADIs are extension points in ABAP code: developers implement the BADI body. If implemented, the BADI is called. This is also modification free: when a new version of the report is delivered, the BADI implementation by the developer is kept.

Described implementations of the subject matter can include one or more features, alone or in combination.

For example, in a first implementation, a computer-implemented method includes provisioning a development account, the provisioning including a request for a backing service, comprising: generating a developer schema in a database; generating a table link in the developer schema to shared tables required for the new development environment; generating a delta table; and generating a union view reading data from the delta table and a shared table corresponding to the delta table; obtaining a runtime application server, the runtime application server writing to the delta table and reading from the delta table and the shared table corresponding to the delta table; configuring a repository in a version control system; configuring the runtime application server to connect to the generated developer schema of the provisioned development account; and providing an identifier to the provisioned development account.

The foregoing and other described implementations can each optionally include one or more of the following features:

A first feature, combinable with any of the following features, wherein the table link links to a master database schema.

A second feature, combinable with any of the previous or following features, wherein the delta table has the same structure a corresponding shared table.

A third feature, combinable with any of the previous or following features, wherein the union view selects from the delta table if content exists, otherwise from the shared table.

A fourth feature, combinable with any of the previous or following features, comprising determining if content associated with the development account already exists in the version control system.

A fifth feature, combinable with any of the previous or following features, wherein if content exists in the version control system: receiving a selection of a repository in the version control system to use; syncing content associated with the selected repository to a file system directory structure; calling a tool to create a deployment file out of the content associated with the selected repository; and calling a deploy tool to deploy the deployment file to the provisioned development account.

A sixth feature, combinable with any of the previous or following features, comprising: changing code or content in the development account; writing changes to the code or content to a transport order; and once the transport is released, the transport is exported to a file system and imported to the version control system repository.

In a second implementation, a non-transitory, computer-readable medium storing one or more instructions executable by a computer system to perform operations comprising: provisioning a development account, the provisioning including a request for a backing service, comprising: generating a developer schema in a database; generating a table link in the developer schema to shared tables required for the new development environment; generating a delta table; and generating a union view reading data from the delta table and a shared table corresponding to the delta table; obtaining a runtime application server, the runtime application server writing to the delta table and reading from the delta table and the shared table corresponding to the delta table; obtaining a runtime application server; configuring a repository in a version control system; configuring the runtime application server to connect to the generated developer schema of the provisioned development account; and providing an identifier to the provisioned development account.

The foregoing and other described implementations can each optionally include one or more of the following features:

A first feature, combinable with any of the following features, wherein the table link links to a master database schema.

A second feature, combinable with any of the previous or following features, wherein the delta table has the same structure a corresponding shared table.

A third feature, combinable with any of the previous or following features, wherein the union view selects from the delta table if content exists, otherwise from the shared table.

A fourth feature, combinable with any of the previous or following features, comprising determining if content associated with the development account already exists in the version control system.

A fifth feature, combinable with any of the previous or following features, wherein if content exists in the version control system: receiving a selection of a repository in the version control system to use; syncing content associated with the selected repository to a file system directory structure; calling a tool to create a deployment file out of the content associated with the selected repository; and calling a deploy tool to deploy the deployment file to the provisioned development account.

A sixth feature, combinable with any of the previous or following features, comprising: changing code or content in the development account; writing changes to the code or content to a transport order; and once the transport is released, the transport is exported to a file system and imported to the version control system repository.

In a third implementation, a computer system, comprising: a computer memory; and a hardware processor interoperably coupled with the computer memory and configured to perform operations comprising: provisioning a development account, the provisioning including a request for a backing service, comprising: generating a developer schema in a database; generating a table link in the developer schema to shared tables required for the new development environment; generating a delta table; and generating a union view reading data from the delta table and a shared table corresponding to the delta table; obtaining a runtime application server, the runtime application server writing to the delta table and reading from the delta table and the shared table corresponding to the delta table; configuring a repository in a version control system; configuring the runtime application server to connect to the generated developer schema of the provisioned development account; and providing an identifier to the provisioned development account.

The foregoing and other described implementations can each optionally include one or more of the following features:

A first feature, combinable with any of the following features, wherein the table link links to a master database schema.

A second feature, combinable with any of the previous or following features, wherein the delta table has the same structure a corresponding shared table.

A third feature, combinable with any of the previous or following features, wherein the union view selects from the delta table if content exists, otherwise from the shared table.

A fourth feature, combinable with any of the previous or following features, comprising: determining if content associated with the development account already exists in the version control system; and if content exists in the version control system: receiving a selection of a repository in the version control system to use; syncing content associated with the selected repository to a file system directory structure; calling a tool to create a deployment file out of the content associated with the selected repository; and calling a deploy tool to deploy the deployment file to the provisioned development account.

A fifth feature, combinable with any of the previous or following features, comprising: changing code or content in the development account; writing changes to the code or content to a transport order; and once the transport is released, the transport is exported to a file system and imported to the version control system repository.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    provisioning an isolated ABAP development account, the provisioning including a request for a backing service, comprising:
        generating a developer schema in a database;
        generating a table link in the developer schema to read only shared tables required for the new development environment;
        generating a delta table; and
        generating a union view reading data from the delta table and a shared table corresponding to the delta table;
    obtaining a runtime application server, the runtime application server writing to the delta table and reading from the delta table and the shared table corresponding to the delta table;
    configuring a repository in a version control system by:
        determining if content associated with the provisioned development account already exists in the version control system;
        if content exists:
            receiving a selection of a repository in the version control system to use;
            syncing content associated with the selected repository to a file system directory structure;
            calling a tool to create a deployment file out of the content associated with the selected repository;
            calling a deploy tool to deploy the deployment file to the provisioned development account;
    configuring the runtime application server to connect to the generated developer schema of the provisioned development account;
    providing an identifier to the provisioned development account, the identifier identifying the repository; and
    using the identifier, importing changes to content in the provisioned development account into the repository.

2. The computer-implemented method of claim 1, wherein the table link links to a master database schema.

3. The computer-implemented method of claim 1, wherein the delta table has the same structure as the shared table corresponding to the delta table.

4. The computer-implemented method of claim 1, wherein the union view selects from the delta table if content exists, otherwise from the shared table.

5. The computer-implemented method of claim 1, comprising:
    changing code or content in the development account;
    writing changes to the code or content to a transport order; and
    once the transport is released, the transport is exported to a file system and imported to the version control system repository.

6. A non-transitory, computer-readable medium storing one or more instructions executable by a computer system to perform operations comprising:

provisioning an isolated ABAP development account, the provisioning including a request for a backing service, comprising:
   generating a developer schema in a database;
   generating a table link in the developer schema to read only shared tables required for the new development environment;
   generating a delta table; and
   generating a union view reading data from the delta table and a shared table corresponding to the delta table;
obtaining a runtime application server, the runtime application server writing to the delta table and reading from the delta table and the shared table corresponding to the delta table;
configuring a repository in a version control system by:
   determining if content associated with the provisioned development account already exists in the version control system;
   if content exists:
     receiving a selection of a repository in the version control system to use;
     syncing content associated with the selected repository to a file system directory structure;
     calling a tool to create a deployment file out of the content associated with the selected repository;
     calling a deploy tool to deploy the development file to the provisioned development account;
configuring the runtime application server to connect to the generated developer schema of the provisioned development account;
providing an identifier to the provisioned development account, the identifier identifying the repository; and
using the identifier, importing changes to content in the provisioned development account into the repository.

7. The non-transitory, computer-readable medium of claim 6, wherein the table link links to a master database schema.

8. The non-transitory, computer-readable medium of claim 6 wherein the delta table has the same structure as the shared table corresponding to the delta table.

9. The non-transitory, computer-readable medium of claim 6, wherein the union view selects from the delta table if content exists, otherwise from the shared table.

10. The non-transitory, computer-readable medium of claim 6, comprising:
changing code or content in the development account;
writing changes to the code or content to a transport order; and
once the transport is released, the transport is exported to a file system and imported to the version control system repository.

11. A computer system, comprising:
a computer memory; and
a hardware processor interoperably coupled with the computer memory and configured to perform operations comprising:
   provisioning an isolated ABAP development account, the provisioning including a request for a backing service, comprising:
     generating a developer schema in a database;
     generating a table link in the developer schema to read only shared tables required for the new development environment;
     generating a delta table; and
     generating a union view reading data from the delta table and a shared table corresponding to the delta table;
   obtaining a runtime application server, the runtime application server writing to the delta table and reading from the delta table and the shared table corresponding to the delta table;
   configuring a repository in a version control system by:
     determining if content associated with the provisioned development account already exists in the version control system;
     if content exists:
       receiving a selection of a repository in the version control system to use;
       syncing content associated with the selected repository to a file system directory structure;
       calling a tool to create a deployment file out of the content associated with the selected repository;
       calling a deploy tool to deploy the deployment file to the provisioned development account;
   configuring the runtime application server to connect to the generated developer schema of the provisioned development account;
   providing an identifier to the provisioned development account, the identifier identifying the repository; and
   using the identifier, importing changes to content in the provisioned development account into the repository.

12. The computer system of claim 11, wherein the table link links to a master database schema.

13. The computer system of claim 11, wherein the delta table has the same structure as the shared table corresponding to the delta table.

14. The computer system of claim 11, wherein the union view selects from the delta table if content exists, otherwise from the shared table.

15. The computer system of claim 11, comprising:
changing code or content in the development account;
writing changes to the code or content to a transport order; and
once the transport is released, the transport is exported to a file system and imported to the version control system repository.

* * * * *